(12) United States Patent
Walinski

(10) Patent No.: US 6,381,314 B1
(45) Date of Patent: Apr. 30, 2002

(54) INTERNET AUDIO CHANNEL SELECTION SYSTEM

(76) Inventor: James Walinski, P.O. Box 273, Tolland, CT (US) 06084

( * ) Notice: Subject to any disclaimer, the term of this patent is extended or adjusted under 35 U.S.C. 154(b) by 0 days.

(21) Appl. No.: 09/470,768

(22) Filed: Dec. 23, 1999

(51) Int. Cl.[7] .............................................. H04M 11/00
(52) U.S. Cl. .............................. 379/101.01; 379/110.01; 379/90.01; 370/352
(58) Field of Search ........................ 379/101.01, 90.01, 379/102.01, 102.02, 102.03, 88.17, 110.01; 370/352; 455/403, 426, 185.1, 186.1, 45, 344, 133, 142, 150.1, 164.1, 168.1, 550, 557

(56) References Cited

U.S. PATENT DOCUMENTS

| | | |
|---|---|---|
| 5,561,709 A | 10/1996 | Remillard |
| 5,629,867 A | 5/1997 | Goldman |
| 5,675,734 A | 10/1997 | Hair |
| 5,726,909 A | 3/1998 | Krikorian |
| 5,731,844 A * | 3/1998 | Rauch et al. ................ 348/563 |
| 5,790,794 A | 8/1998 | DuLac et al. |
| 5,809,246 A | 9/1998 | Goldman |
| 5,844,552 A | 12/1998 | Gaughan et al. |
| 5,867,821 A | 2/1999 | Ballantyne et al. |
| 5,899,699 A | 5/1999 | Kamiya |
| 5,926,789 A * | 7/1999 | Barbara et al. .............. 704/275 |
| 5,931,906 A | 8/1999 | Fidelibus, Jr. et al. |
| 5,935,206 A | 8/1999 | Dixon et al. |
| 6,014,569 A * | 1/2000 | Bottum ........................ 455/466 |

FOREIGN PATENT DOCUMENTS

JP    411112446 A  *  4/1999  ............ H04H/1/00

OTHER PUBLICATIONS

"Telos Systems Releases the Audioactive Tuner, World's First Standalone Internet Audio Tuner/Player"; http://www-.zephyr.com/press/pr040498b.html; Las Vegas, NV, Apr. 4, 1998.

Qureshey et al.; Intelligent Radio; WO 99/38266, pages as noted in the action, Jul. 1999.*

* cited by examiner

Primary Examiner—Duc Nguyen
Assistant Examiner—Melur Ramakrishnaiah
(74) Attorney, Agent, or Firm—McCormick, Paulding & Huber LLP; Daniel G. Mackas

(57) ABSTRACT

An Internet audio channel selection system includes an audio channel selection device. The device includes a housing accommodating an electronic display for displaying audio channel selection information, an audio channel selection interface for selecting an audio channel from the audio channel selection information, at least one input interface for communicating with the Internet, and at least one output interface for communicating with at least one audio processing device. The device further includes a microprocessor disposed within the housing and communicating with the electronic display, the input interface and the output interface for downloading the audio channel selection information and selected audio channel transmission from the Internet, and directing the audio channel transmission to the at least one audio processing device. The selection system further includes a server to communicate with the audio channel selection device via the Internet. The server includes the audio channel selection information to be automatically displayed via the electronic display of the audio channel selection device.

13 Claims, 7 Drawing Sheets

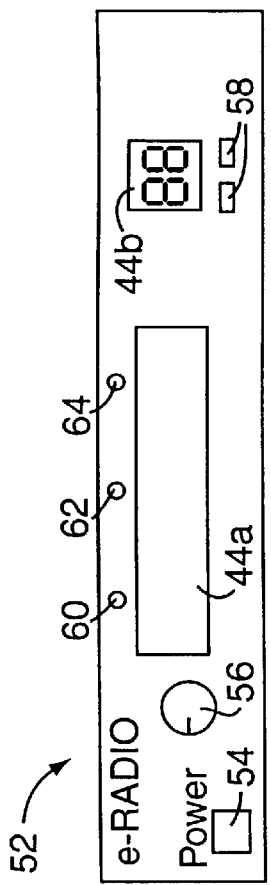
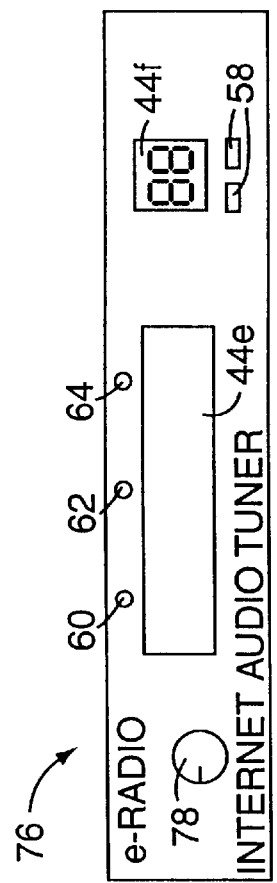
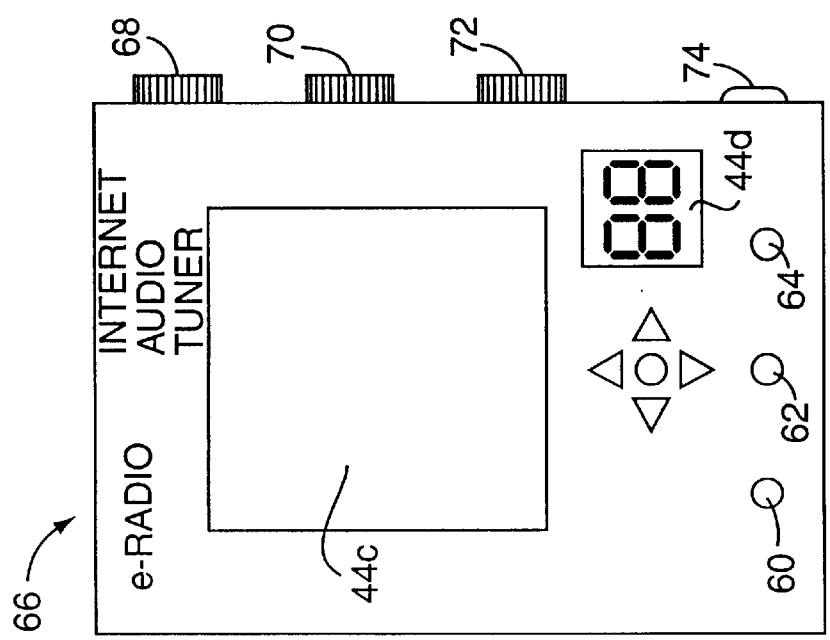

INTERNET AUDIO CHANNEL SELECTION SYSTEM

FIELD OF THE INVENTION

The present invention relates generally to an audio tuner, and more particularly to an audio network channel selection system for use on the Internet.

BACKGROUND OF THE INVENTION

The AM/FM tuner has remained generally the same since its inception. Users can listen to radio stations in their geographical area. However, the quality of the signal varies from AM to FM. It also depends on the signal strength broadcast by the radio station and the quality of user's antenna and tuner. The Internet has eliminated many of radio's shortcomings.

Audio transmission can be downloaded from some web sites to a personal computer via the Internet. The task of searching for audio transmission can be time consuming since a relatively small percentage of web sites support or include links for downloading audio transmission. Some web sites offer links for downloading audio transmission, thus simplifying the process for selecting audio. A drawback with downloading audio transmission from the Internet is that a personal computer is generally required which is a major expense to those only interested in downloading Internet audio to other audio processing devices, such as loudspeakers.

Other means for accessing the Internet without the need for a personal computer have been developed. For example, Web TV® uses a special box to be coupled to a television set for accessing the Internet and downloading audio transmission to either television loudspeakers or loudspeakers coupled to the television set. A drawback is that a television set is required for accessing the audio transmission and relaying it to loudspeakers or other audio processing devices.

Devices which can download audio transmissions from the Internet without the need for a personal computer or television set have been or are being developed. For example, Telos Systems is soon to release a stand-alone Internet audio tuner/player which allows listeners to tune into audio streams available on the Internet. A drawback is that the user must know which world wide web addresses carry audio transmissions, and then must manually program the known web address or universal resource locator (URL) into the tuner to access audio stream or transmission. A drawback is that the tuner does not include means for searching the Internet for audio streams or for automatically selecting such streams from among a selection listed on a web site.

Accordingly, it is an object of the present invention to provide an Internet audio network channel selection system which overcomes the above-mentioned drawbacks and disadvantages.

SUMMARY OF THE INVENTION

An Internet audio network channel selection system comprises an audio network channel selection device for interfacing with Internet audio network programs. The device is only operational with a subscription to network programming. The device includes a housing accommodating an electronic display for displaying audio network channel selection information, an audio channel selection interface for selecting an audio network channel from the audio channel selection information, at least one input interface for communicating with the Internet, and at least one output interface for communicating with at least one audio processing device. The device further includes a microprocessor disposed within the housing and communicating with the electronic display, the input interface and the output interface for downloading the audio network channel selection information and selected audio network channel transmission from the Internet, and directing the audio network channel transmission to the at least one audio processing device. The selection system further comprises a network server to communicate with the audio network channel selection device via the Internet. The network server includes the audio network channel selection information to be automatically displayed, via the electronic display of the audio network channel selection device, means for receiving a selected audio network channel transmission, and means for downloading the selected audio network channel transmission to the audio network channel selection device.

An advantage of the present invention is that the system permits the user to download audio streams to speakers or a storage device without the need of a personal computer or Web TV® unit.

Another advantage of the present invention is that the system permits the selection of audio web sites displayed on a system web page without the need of memorizing or entering a universal resource locator.

A further advantage of the present invention is that audio transmissions downloaded to a audio channel selection device may be stored either internally or on a peripheral device such as a tape deck coupled to the selection device.

A yet further advantage of the present invention is that the system enables specific programs in the Internet audio network channels to be recorded automatically.

Another advantage of the present invention is that the system creates a platform for receiving Internet audio network programs and organizes programming material with predetermined channel numbers.

Another advantage of the present invention is that the system enables users to access exclusive packaged subscription Internet audio network programming.

Another advantage of the present invention is that the system incorporates a platform that organizes stored audio network transmissions and stored URL searches.

Other advantages will be made apparent with references to the following description and accompanying drawings.

BRIEF DESCRIPTION OF THE DRAWINGS

FIG. 3 is an Internet audio network channel selection device for home use.

FIG. 4 is another embodiment of an Internet audio network channel selection device which is portable.

FIG. 5 is a further embodiment of an Internet audio network channel selection device for use with an automobile.

DETAILED DESCRIPTION OF THE PREFERRED EMBODIMENT

Figure 1:
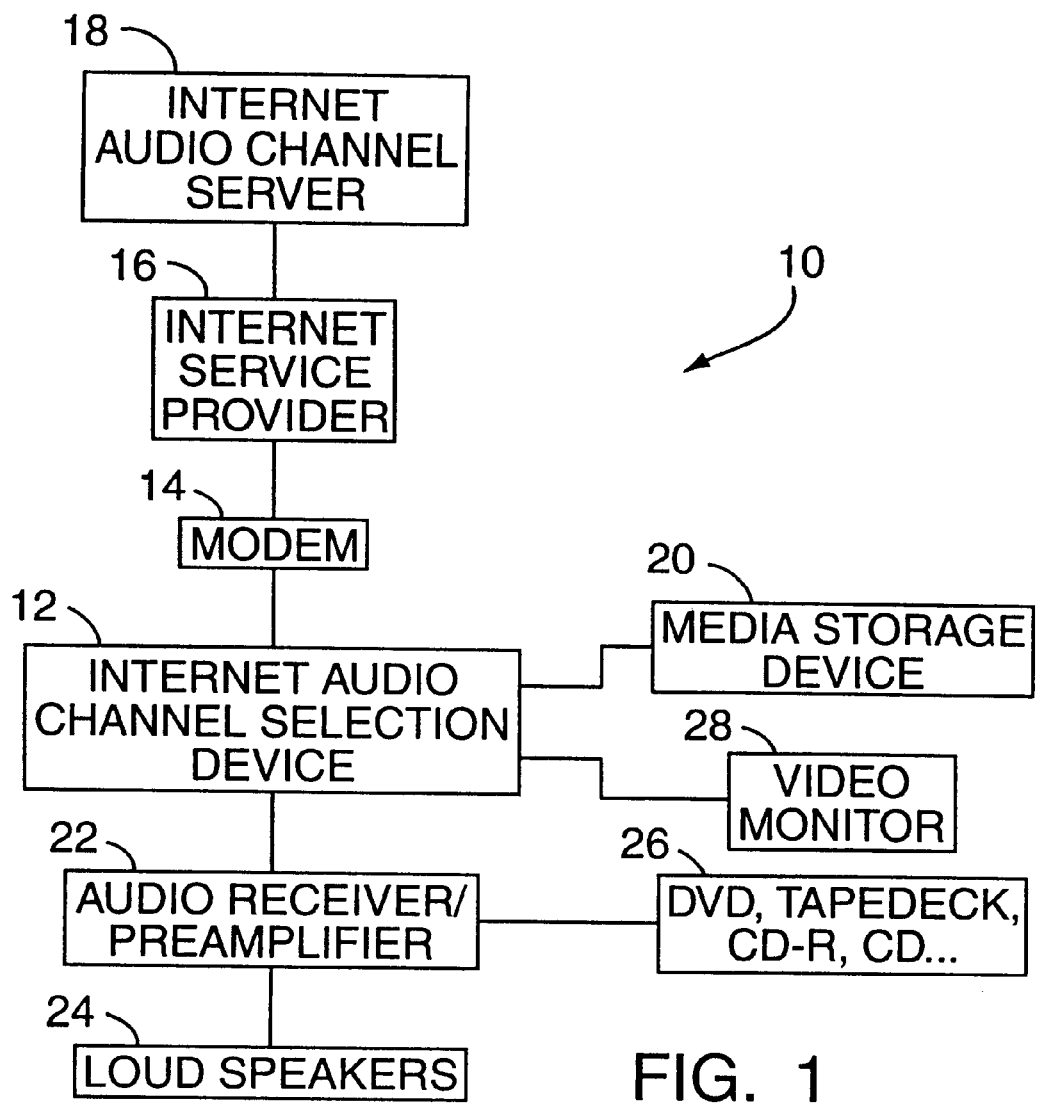
FIG. 1 is a block diagram illustrating an Internet audio network channel selection system embodying the present invention.

With reference to FIG. 1, an Internet audio network channel selection system embodying the present invention is generally designated by the reference number 10. The system 10 includes an Internet audio network channel selection device 12 which is a generally stand-alone unit that is connectable to the Internet without the assistance of a personal computer (PC). More specifically, the selection device 12 is coupled to a modem 14, which is preferably an internal modem within the selection device, for interfacing with an Internet service provider (ISP) 16.

The device 12 may receive an Internet connection in several ways. For example, the device 12 may include phone jacks (not shown) on the back of the device to enable an Internet connection through the telephone company. A cable modem or satellite modem may be connected to the back of the device 12. In addition, an Internet connection may be made via a digital radio receiver that carries an Internet service provider connection.

The selection device 12 accesses and downloads via the ISP 16 audio information and audio streams or transmissions from an Internet audio network channel server 18 to be discussed in greater detail hereinbelow. The selection device 12 may optionally communicate with a media storage device 20 for saving audio transmissions downloaded from the Internet to the selection device. The selection device 12 is also coupled to an audio receiver or preamplifier 22 for boosting the downloaded audio signal for driving, for example, loudspeakers 24 or for downloading audio to or activating other audio processing devices 26 such as a CD player, CD-R player, CD-RW player, DVD player, DVD-R player, DVD-RAM player, tape player, DAT player, mini-disc player and mini-disc-R player. The selection device 12 may also specify an appropriate audio processing device 26 to record or play back on demand or at a predetermined time. In addition, the selection device 12 may automatically record programs from any audio network channel by entering the name of the program. One of the appropriate audio processing devices 26 may be selected to record the program, or the media storage device 20 may record the program internally. The selection device 12 may also be optionally coupled to a video monitor 28 such as a television screen or a computer monitor as an alternative to a display on the selection device itself for displaying web site information accessed over the Internet.

Figure 2:
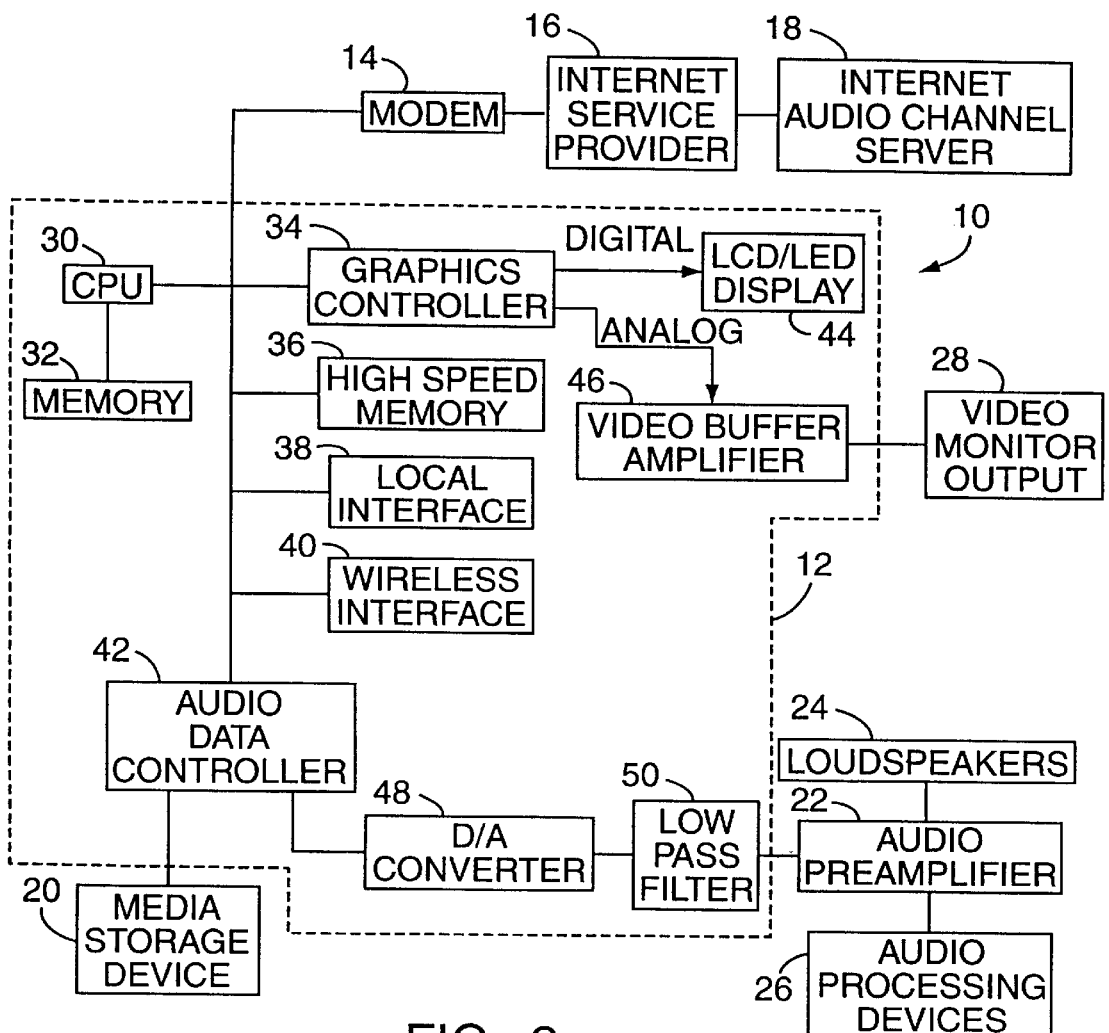
FIG. 2 is a more highly detailed block diagram of the Internet audio network channel selection system of FIG. 1.

Turning now to FIG. 2, the Internet audio network channel selection device 12 includes a central processing unit (CPU) 30 and associated memory 32 which may be incorporated within or separate from the CPU. The memory 32 stores a software program for enabling the user to operate the selection device 12. For example, the internal software enables the user to search, store and program audio downloaded from the Internet through the selection device 12. The CPU 30 is coupled to the modem 14, a graphics controller 34, high speed memory 36, a local interface 38 of the selection device 12, a wireless interface 40 such as a remote control or wireless keypad, and an audio data controller 42. The high speed memory 36 facilitates the organization of data downloaded into the selection device 12 at a fast rate so that the system 10 does not lag or otherwise become slow in its execution.

The graphic controller which aids the CPU 30 in processing data to be displayed includes a first digital output for driving a display such as LCD display 44, but alternatively may drive other practical types of displays such as an LED display. The graphics controller also includes a second analog output coupled to a video buffer amplifier 46 which, in turn, drives the video monitor 28. The audio data controller 42 has a first output coupled to a media storage device which may be, for example, a computer harddrive, DVD-RAM, or CD-R device, and a second output coupled to a D/A converter 48 which, in turn, has an output coupled to a low pass filter 50. An output of the low pass filter 50 is coupled to the audio receiver or preamplifier 22 for driving the loudspeakers 24 and/or the audio processing devices 26.

With reference to FIG. 3, the selection device 12 may be enclosed in a rectangular housing 52 that resembles stereo components such as a stereo receiver. The housing 52 includes a power button 54 for activating the selection device 12 from a conventional power source such as, for example, a 120 volts AC source. The housing 52 also includes a first electronics display, such as LCD display 44a which displays web pages downloaded into the selection device 12 from the Internet, and preferably from audio network channel selection pages to be more fully described hereinbelow. The housing further includes a rotary knob 56 which is rotated to scroll or preselect stations or other audio content listed on the web pages. The knob 56 may also be pressed such that the internal software finds and downloads the selected URL associated with the selected option. A second electronics display, such as LED display 44b includes two, seven segment indicators to identify a favorite Web site or URL that has been stored or earmarked to a specific channel number and later recalled or selected by channel select buttons 58, 58 for quick and easy access to the Web site. A first through third page select buttons 60, 62 and 64 respectively download an audio library page, a network audio page and an Internet audio page from the audio network channel selection pages to be described.

As shown in FIG. 4, the selection device 12 may also be disposed within a housing 66 for portable use such as a boom box or hand-held unit with internal amplification and speakers. Like elements with those in FIG. 3 are labelled with like reference numbers. The housing 66 preferably takes the form of a portable radio or tape player that easily fits in the hand of the user, and is preferably powered by one or more DC batteries (not shown). Similarly to the housing 52 for home use shown in FIG. 3, the housing 66 for portable use includes an LCD display 44c for displaying web pages thereon, and an LED display 44d for identifying the selected audio channel. The housing also includes the audio library button 60, the network audio button 62 and the Internet audio button 64 for selecting particular web pages from the audio channel selection pages. The portable housing 66 further includes rotary dials 68, 70 and 72 for respectively adjusting the volume, bass and treble of the downloaded audio transmission. The portable housing further includes an ear phone outlet 74 for plugging a conventional set of earphones into the selection device 12.

Turning to FIG. 5, the selection device 12 may further be disposed within a housing 76 for use with an automobile. Like elements with those shown in FIGS. 3 and 4 are labelled with like reference numbers. The housing 76 preferably takes the form of a car stereo receiver that is easily incorporated with the stereo equipment of a vehicle, and is powered ultimately from the automobile's DC battery. As can be seen in FIG. 5 the housing 76 is similar to the housing 52 for home use, shown in FIG. 3, except that the housing includes a combined power and scroll selector button 78.

Figure 6:
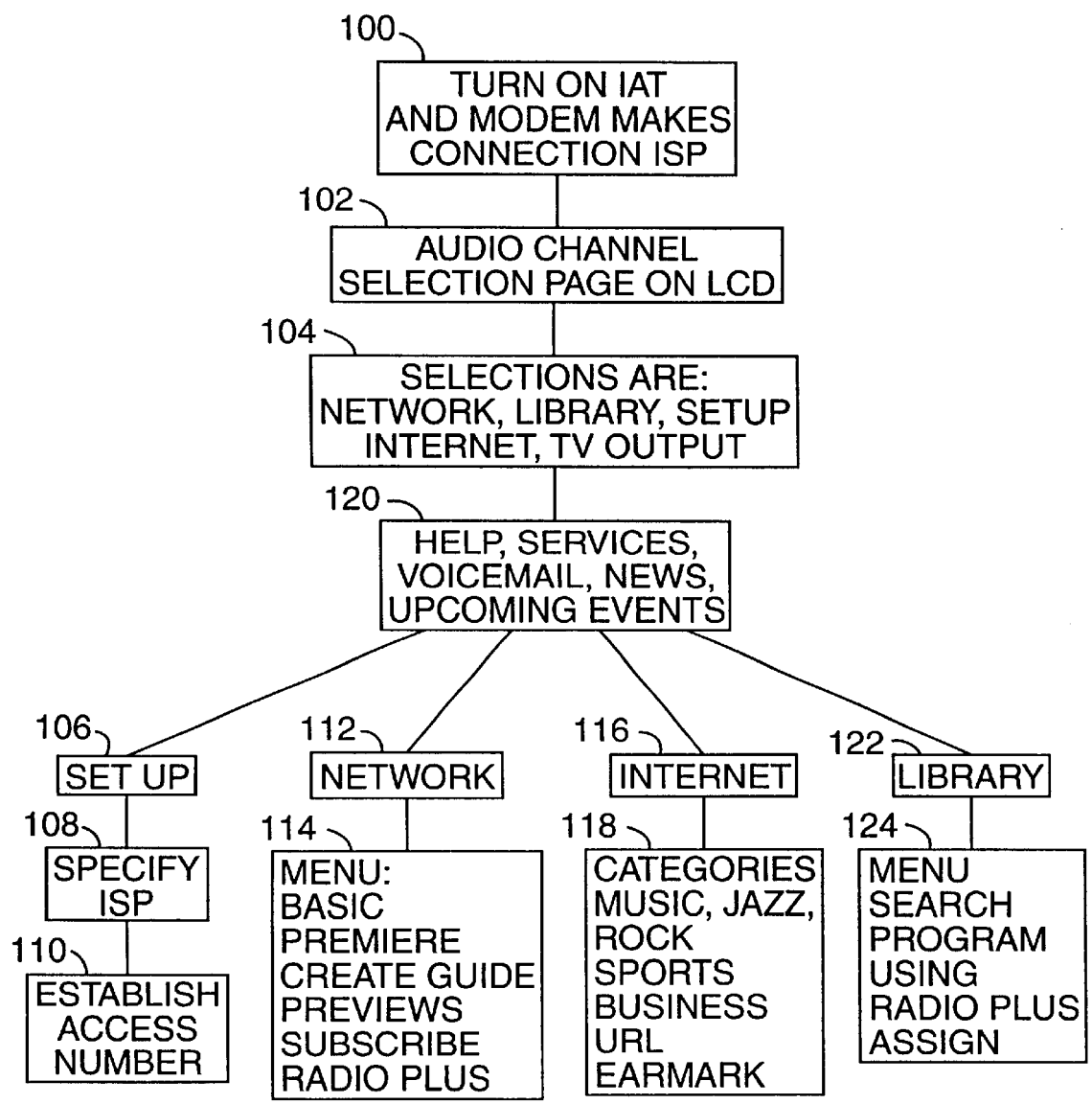
FIG. 6 is a flow chart illustrating the software implementation of the audio network channel selection system.

Referring to FIG. 6, the general implementation of the audio network channel selection system 10 will now be described. As shown in step 100 the selection device is turned-on to automatically establish a connection with an Internet service provider (ISP). The audio network channel selection homepage is then automatically downloaded by the selection device 12 and shown on its LCD display 44 (step 102). The user may then select from various options including, for example, network audio, Internet audio, audio library, setup and TV output (step 104) to download audio transmissions to loudspeakers connected to a stereo receiver or preamplifier, or to other audio processing devices without the need of a personal computer or Web TV® unit. Further options on the homepage include help, services, earmarks, voice mail, news and upcoming events (step 120). The audio network channel selection homepage is updated periodically, preferably daily, and informs users on how to set-up and operate the system 10. Users will also be able to chat with other users either by keyboard or by voice interfacing with conventional voice interface software and hardware employed with personal computers.

If set-up is selected (step 106), the user may specify which ISP is to be used (step 108) to establish an ISP access number (step 110). If network audio is selected (step 112), a network audio page will be downloaded onto the LCD display for providing further options to select such as, for example, create channel, guide, pay-per-hear, preview shows, programming, subscribe and channels (step 114). If Internet audio is selected (step 116) the Internet audio page is downloaded to the LCD display (step 118). The Internet audio page includes categories such as sports, music, business, etc. In addition, there is an area where a specific URL may be entered and searched. If the audio library is selected (step 122) an audio library page appears (step 124). The user may search for stored audio streams, program and organize recorded material and assign channel numbers to specific programmed sequences. Any one of the audio library, network audio and Internet audio pages may be programmed to appear first when the unit is turned on. Further, any page may be accessed from any other page.

Figure 7:
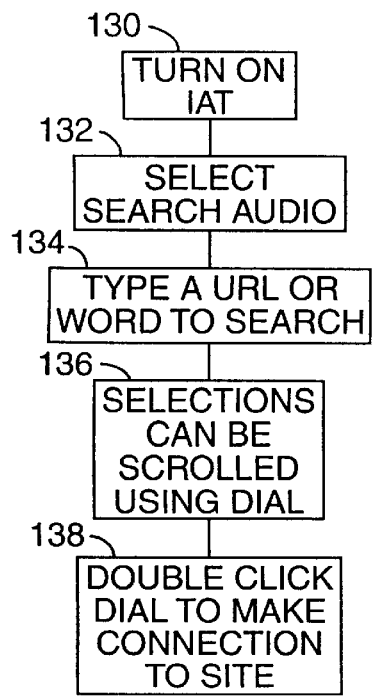
FIG. 7 is a flow chart illustrating a specific software implementation of the audio network channel selection system which searches the Internet for audio channel transmissions.

FIG. 7 explains in greater detail the implementation of the search or Internet audio feature of the audio channel selection system 10. After the selection device 12 is turned on (step 130), the Internet audio button 64 may be pressed on the housing of the selection device (step 132) to download directly the Internet audio page without the need to go through the audio channel selection home page. The user may then type a universal resource locator (URL) or enter a word to search (step 136). Selections may be made in the different categories such as jazz, rock, and sports by rotating the rotary scroll knob on the selection device 12, and then the knob may be depressed or "double-clicked" (step 138) to establish connection with the site carrying audio transmission.

Figure 8:
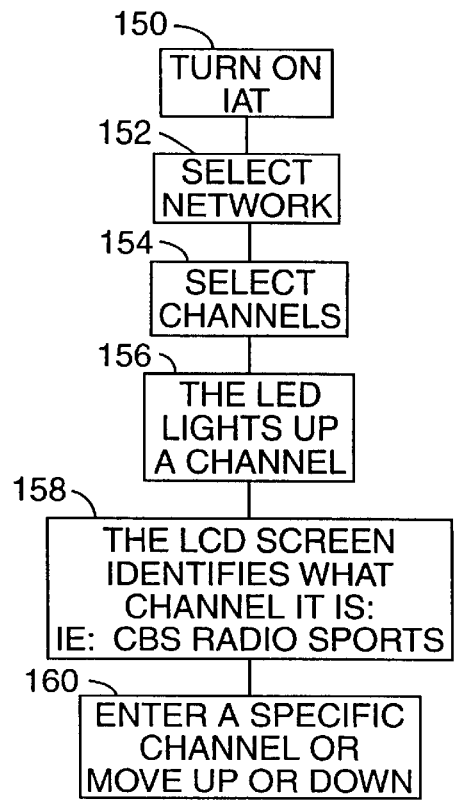
FIG. 8 is a flow chart illustrating a specific software implementation of the audio network channel selection system which selects channels carried on a system web site.

FIG. 8 illustrates in greater detail the implementation of the channel selection feature of the audio channel selection system 10. After the selection device 12 is turned on (step 150), the network audio button 62 may be pressed on the housing of the selection device (step 152) to download directly the network audio web page without the need to go through the audio channel selection home page. The user may then scroll through and "highlight" or preliminarily select audio channels listed on the network page (step 154). The LED display on the selection device 12 identifies the preliminarily selected channel (step 156). Meanwhile, the LCD display of the selection device 12 further identifies the preliminarily selected channel, such as for example, "CBS Radio Sports" (step 158). The user then enters the selected channel for downloading by pressing the rotary knob, or may continue to scroll or move a selector up or down among the available channels in order to make a decision (step 160).

Figure 9:
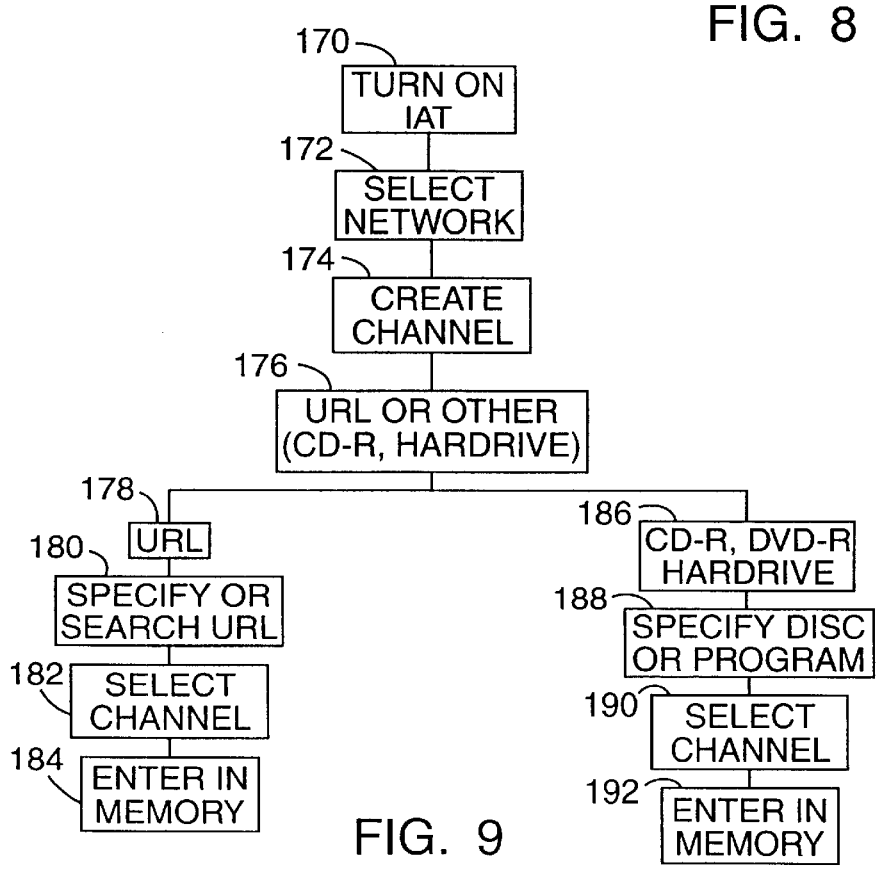
FIG. 9 is a flow chart illustrating a specific software implementation of the audio network channel selection system which creates audio channels.

The flowchart of FIG. 9 illustrates in greater detail the implementation of the create channel feature of the audio network channel selection system 10. After the selection device 12 is turned on (step 170), the network audio button 62 may be pressed on the housing of the selection device (step 172) to download directly the network audio web page without the need to go through the audio network channel selection home page. The user may then create a channel on the network web page (step 174) by preliminarily selecting a URL or other address of a peripheral device coupled to the selection device such as, for example, a CD-R player or hard drive of a personal computer (step 176).

If a URL is preliminarily selected (step 178), a desired URL may be immediately entered or a URL may be searched (step 180). A channel uncovered in the search may then be selected (step 182) such that the selected URL is placed into memory within the selection device 12 (step 184). A URL may also be imported from the Internet audio page and assigned a specific channel.

If a peripheral device is preliminarily selected (step 186), a specific disc supported on the peripheral device or audio program stored on the device may then be specified (step 188). The channel to be associated with the disc or program is then selected (step 190) and entered into memory within the selection device 12 (step 192).

Figure 10:
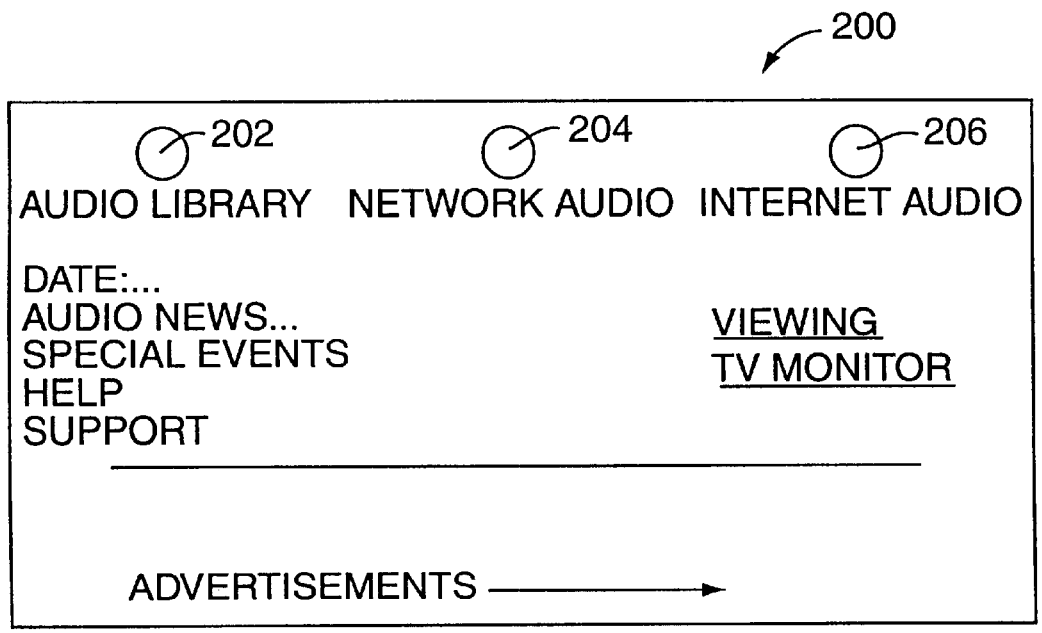
FIG. 10 schematically illustrates an opening or home page from the system web site which is displayed on the Internet audio network channel selection device.

FIGS. 10–14 illustrate various web pages which may be employed as part of the audio network channel selection pages. FIG. 10, for example, schematically shows an audio channel selection home page 200 which typically is downloaded to the selection device 12 and shown on its LCD display immediately upon turning on the selection device. As shown in FIG. 10, the home page 200 includes "soft buttons" such as an audio library button 202, network audio button 204 and Internet audio button 206 for accessing these pages via the home page. For accessing these web pages, the soft buttons 202, 204 and 206 respectively correspond to the buttons 60, 62 and 64 located on the housing of the selection device 12.

As shown in FIG. 10, the audio network channel selection home page 200 includes helpful information, such as, the date, audio news, special events, help for using the audio channel support system, system support, viewing options which include either viewing the web pages on the LCD display of the audio channel selection device or on a television monitor coupled to the audio channel selection device. The home page 200 may also include advertisements that periodically change or scroll across the home page.

As shown in FIG. 10, the audio channel selection home page 200 includes helpful information, such as, the date, audio news, special events, help for using the audio channel support system, system support, viewing options which include either viewing the web pages on the LCD display of the audio channel selection device or on a television monitor coupled to the audio channel selection device. The home page 200 may also include advertisements that periodically change or scroll across the home page.

Figure 11:
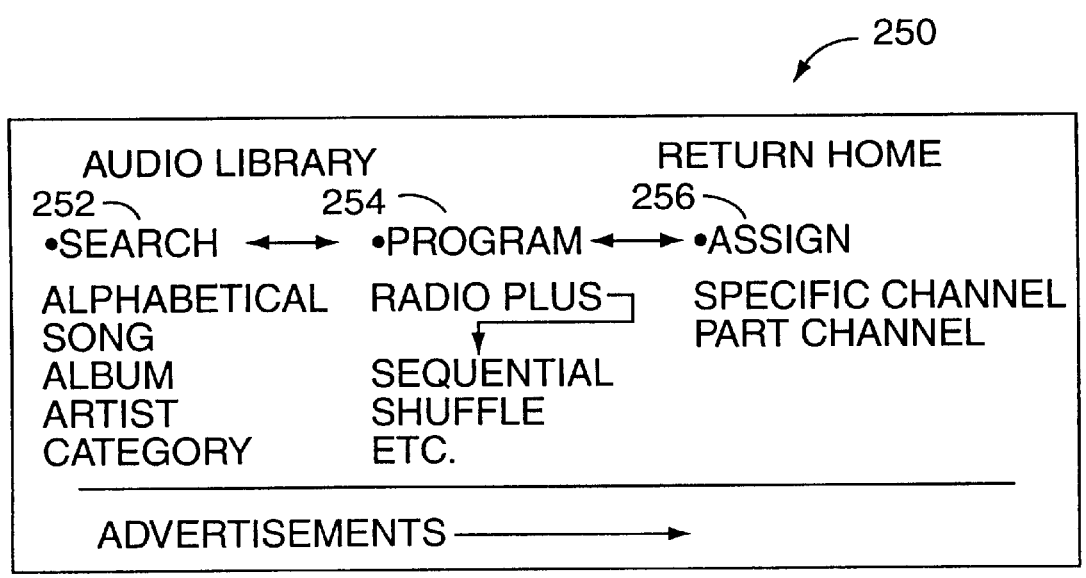
FIG. 11 schematically illustrates an audio library page selected from the opening page of FIG. 10.

If the audio library button 202 on the home page is selected via remote control, wireless keypad or the scroll knob on the selection device 12 (see FIG. 10), or if the audio library button 60 on the audio channel selection device 12 (see FIGS. 3–5) is pressed, an audio library web page 250, as shown in FIG. 11, is downloaded and displayed on the LCD display 44 of the selection device 12 or a television monitor coupled to the audio channel selection device 12.

The Audio Library is the user's personal storage area for audio retrieved from the Internet. Once a song or program is found in either the Network Audio or Internet Audio sections it can be downloaded and stored into the Audio Library. This will occur internally (memory chip) or be routed to an external recording device. After it has been stored, it can be recalled in the Audio Library. The song or program can be searched and found in numerous ways. A category or artist log can be searched and any of the items can be organized in any way the user desires, i.e., favorites, jazz, rock, etc. Another feature to the Audio Library is the programming function. This incorporates the Radio Plus+ program. This will allow the user to shuffle the playback of recorded items or play in any desired order. Once the Radio Plus+is highlighted and clicked on, a new screen appears and there are several choices that can be made. The user can simply shuffle a certain number of items or even program them to play at a certain time in the future. A day and time grid is presented to ease the programming. Once a specific time is selected the item can be entered into the schedule. The last section of the Audio Library is called Assign. This will enable the user to pre-program a listening show for any duration. It could be for one minute or two hours. After the show is programmed, the user can assign a channel to it and whenever that channel is selected the program will automatically play back. After the channel is selected, the program can be fast forwarded through or stopped altogether and replayed.

As shown in FIG. 11, the audio library web page 250 includes a search engine 252 which searches the audio library for recorded audio streams located internally or on external storage devices. The search results can be refined by, for example, song, album, artist, and category. The audio library page 250 also includes a program feature 254 for programming the audio network channel selection device 12 to download audio programs in advance of play time. The programming may be entered with Radio Plus+, which may include advanced playback features such as sequential or shuffle.

Figure 12:
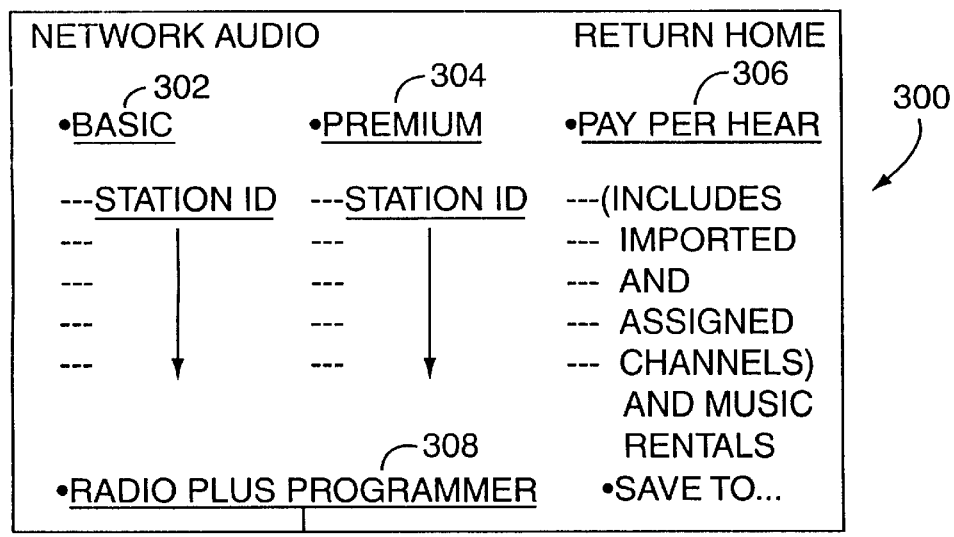
FIG. 12 schematically illustrates a network audio page selected from the opening page of FIG. 10.

If the network audio button 204 on the home page (see FIG. 10) or if the network audio button 62 on the audio network channel selection device 12 (see FIGS. 3–5) is selected or pushed, a network audio web page 300, as shown in FIG. 12, is downloaded and displayed on the LCD display 44 of the selection device 12 or a television monitor coupled to the audio network channel selection device. As shown in FIG. 12, the network audio web page 300 includes lists of links to web sites carrying audio transmissions. The lists may be apportioned among several categories. As shown in FIG. 12, for example, the basic list 302 includes Internet radio transmission sites having radio stations carrying radio transmissions which may be downloaded for no charge. A premium list 304 accesses the radio stations listed therein for a nominal monthly charge.. The pay-per-hear list 306 includes radio stations which requires a fee each time an audio channel listed therein is selected.

More specifically, the Network Audio section allows the user to interface with a network of audio channels. A sports channel, for instance, may have sports programming 24 hours a day. All of the basic channels have advertising included but the premium channels do not. There are also channels that will allow the user to rent a block of CDs for a specified period of time. When that channel is selected, the songs are displayed on the LCD and chosen accordingly. A channel is displayed on the LCD screen and on the LED of the device 12. Channels may be surfed exclusively via the LED. When the user desires to record and store an audio stream into the Audio Library, the user may simply click on the "save to" button. The Radio Plus+part of Network Audio allows the user to record any station, program, song, artist, time slot, etc. After the Radio Plus+ is selected, a programming grid 350 appears with channel numbers, show descriptions, and time slots. By scrolling through the grid the user can find a program that they want to record. Simply clicking on the program will save it in the Audio Library under a title described by the user, it can be programmed to only record the program once, a few times or until the user cancels the instructions. Another way that the recording of a program may be initiated is by entering a code number. Certain programs, artists and songs will have codes assigned to them and when entered into the Radio Plus+ they are automatically recorded without the need for the user to know the time they will air.

Figure 13:
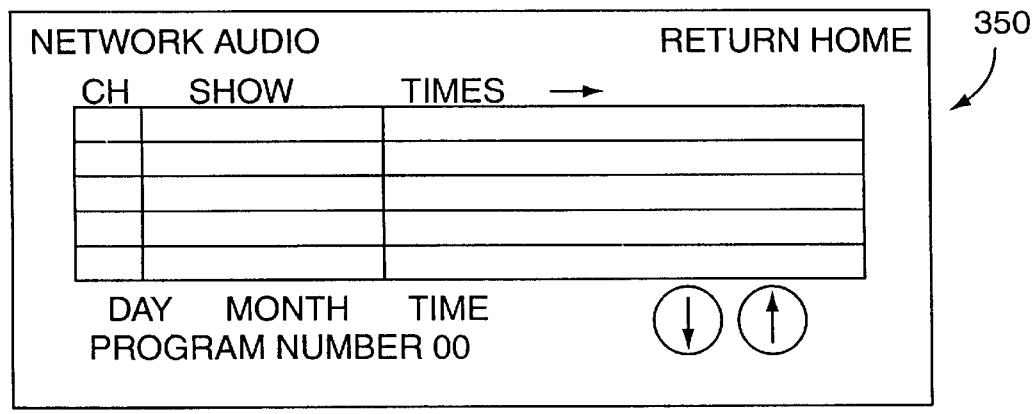
FIG. 13 schematically illustrates an automatic recording page selected from the network audio page of FIG. 12.

If the Radio Plus Programmer link 308 is selected on the network audio web page 300 (see FIG. 12), the Radio Plus Programmer page 350 (see FIG. 13) will be downloaded. As shown in FIG. 13, the Radio Plus program number may then be entered, and the corresponding audio channel, show title and time of show are automatically displayed on the page.

Figure 14:
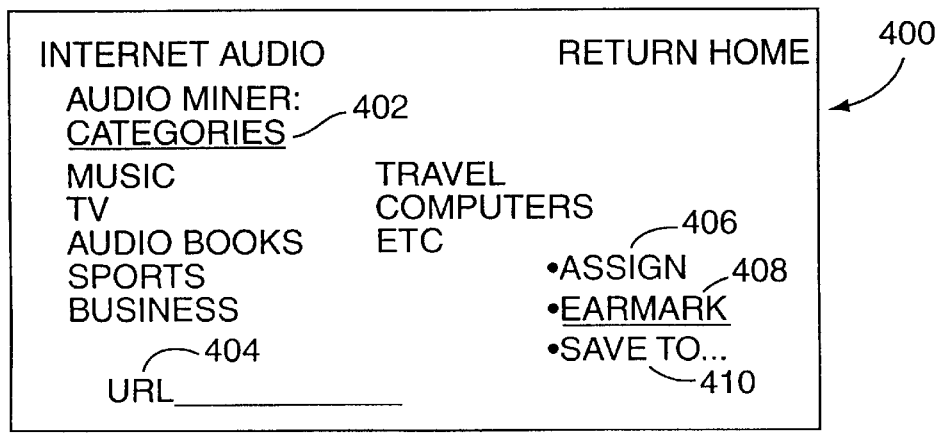
FIG. 14 schematically illustrates an Internet audio page selected from the opening page of FIG. 10.

If the Internet audio button 206 on the home page (see FIG. 10) or if the Internet audio button 64 on the audio network channel selection device 12 (see FIGS. 3–5) is selected or pushed, an Internet audio page 400, as shown in FIG. 14, is downloaded and displayed on the LCD display 44 of the selection device. As shown in FIG. 14, the Internet audio page 400 includes categories list 402 to select audio web sites among different topics such as, for example, music, television, audiobooks, sports, business, travel and computers. Different web sites may be accessed by directly typing in a URL at 404. By selecting the assign 406 function, favorite sites may be assigned a recall channel number. These channel numbers correlate to the channels of the network audio page. The earmark function 408 permits new sites to be saved to the categories list. Further, audio programs may be saved to the Audio Library or to a peripheral device such as tape deck by using the "save to" function 410.

Although this invention has been shown and described with respect to an exemplary embodiment thereof, it should be understood by those skilled in the art that the foregoing and various other changes, omissions, and additions in the form and detail thereof may be made therein without departing from the spirit and scope of the invention. Accordingly, the present invention has been shown and described by way of illustration rather than limitation.

What is claimed is:

1. An Internet audio network channel selection system, the system comprising:

an audio network channel selection device for interfacing with Internet audio network programming, the device including:

a housing accommodating an electronic display for displaying audio network channel selection information, an audio channel selection interface for selecting an audio network channel from the audio channel selection information, at least one input interface for communicating with the Internet, and at least one output interface for communicating with at least one audio processing device; and a microprocessor disposed within the housing and communicating with the electronic display, the input interface and the output interface for downloading the audio network channel selection information and selected audio network channel transmission from the Internet, and directing the audio network channel transmission to the at least one audio processing device; and a network server to communicate with the audio network channel selection device via the Internet, the server including the audio network channel selection information to be automatically displayed, via the electronic display of the audio network channel selection device, means for receiving a selected audio network channel transmission, and means for downloading the selected network audio channel transmission to the audio network channel selection device.

2. A system as defined in claim 1, wherein the output interface of the audio network channel selection device includes a modem.

3. A system as defined in claim 1, wherein the housing is one of a unit for home use, a portable unit, and unit for use with an automobile.

4. A system as defined in claim 1, wherein the server includes a home page to be displayed on the electronic display of the selection device for selecting and downloading audio network channel selection information and selected audio channel transmissions.

5. A system as defined in claim 4, wherein the home page has a menu including audio selection features.

6. A system as defined in claim 5, wherein the audio network channel selection features include selecting channels from the audio network section, storing these transmissions and manually searching URLs.

7. A system as defined in claim 6, wherein the storing audio transmissions feature includes storing the audio transmissions to the microprocessor of the audio network channel selection device.

8. A system as defined in claim 6, wherein the storing audio transmissions feature includes storing the audio transmissions to a peripheral device to be coupled to the audio network channel selection device.

9. A system as defined in claim 6, wherein the audio selection feature of selecting network audio channels includes automatic recording.

10. A system as defined in claim 9, wherein the code number is a Radio Plus+program number.

11. A system as defined in claim 1, wherein the Internet audio network programming is a collection of subscription based programming with identifying channel numbers.

12. A system as defined in claim 5, wherein the audio network selection feature includes voice chat with other listeners while using the selection device.

13. A system as defined in claim 5, wherein the audio network selection feature includes programming specific unused network channels with recorded audio.

* * * * *